United States Patent [19]

Kraft et al.

[11] 3,900,455

[45] Aug. 19, 1975

[54] PROCESS TO EMULSION POLYMERIZE VINYL CHLORIDE

[75] Inventors: Paul Kraft, So. Spring Valley; Jung Il Jin, Irvington, both of N.Y.

[73] Assignee: Stauffer Chemical Company, Westport, Conn.

[22] Filed: Aug. 16, 1974

[21] Appl. No.: 498,488

[52] U.S. Cl. .......................................... 260/92.8 W
[51] Int. Cl. ................................................ C08f 3/30
[58] Field of Search .............................. 260/92.8 W

[56] References Cited
UNITED STATES PATENTS

| | | | |
|---|---|---|---|
| 3,189,587 | 6/1965 | Donat et al. .................. | 260/92.8 W |
| 3,413,274 | 11/1968 | Watanabe et al. ......... | 260/92.8 W X |
| 3,562,238 | 2/1971 | Panks........................... | 260/92.8 W |
| 3,577,401 | 5/1971 | Smith........................... | 260/92.8 W |

*Primary Examiner*—William F. Hamrock

[57] ABSTRACT

The emulsion polymerization of polyvinyl chloride can be conducted without any appreciable polymer buildup or plate-out on the internal surfaces of the polymerization reactor by utilizing a sodium alkyl sulfosuccinate as the emulsifier in the presence of small amounts, e.g., about 0.01% to 3%, by weight, of an ammonium or alkali metal borate.

10 Claims, No Drawings

PROCESS TO EMULSION POLYMERIZE VINYL CHLORIDE

TECHNICAL DESCRIPTION OF THE INVENTION

Polymer plate-out during the emulsion polymerization of polyvinyl chloride requires periodic cleaning of the reactor which is both costly and time consuming. A need therefore exists for an emulsion polymerization of polyvinyl chloride which will substantially reduce the amount of polymer buildup thereby decreasing the number and frequency of reactor cleaning operations.

The basic procedure for emulsion polymerization of polyvinyl chloride (PVC) is well known. It basically comprises polymerizing a vinyl chloride monomer, either alone or in combination with any of the well-known monomers copolymerizable therewith, in an aqueous medium. The use of the terminology "polyvinyl chloride" herein is intended to cover both polyvinyl chloride homopolymers as well as copolymers, and these monomers are present at about 10% to 50% by weight of the aqueous emulsion polymerization medium. The polymerization medium also contains about 0.01 to about 2.0% by weight of a water-soluble catalyst, e.g., ammonium, sodium or potassium persulfate, hydrogen peroxide, or a redox system, such as a mixture of a persulfate with an alkali metal bisulfite, thiosulfate or hydrosulfite. The polymerization medium also contains about 0.2% to 5% by weight of a suitable emulsifier. A wide variety of conventional emulsifiers are known. Some representative emulsifiers are sodium lauryl sulfate, potassium stearate, alkyl benzene sulfonate, ammonium dialkyl sulfosuccinate, and the like. The polymerization is generally carried out at about 35°–70°C., preferably about 40°–55°C., using an autoclave at autogenous pressure.

The present invention relies upon the use of a sodium alkyl sulfosuccinate emulsifier and a small amount of an ammonium or alkali metal borate to give an emulsion polymerization wherein the amount of polymer plate-out is substantially reduced.

The sodium alkyl sulfosuccinates are a well-known class of emulsifiers, McCutcheon's Detergents and Emulsifiers, 1969 Annual, p. 30, which are commercially available. A preferred emulsifier for use in the present invention is Aerosol 268, commercially available from American Cyanamid Company, which is a 50% solids solution of a sodium sulfosuccinate isodecanol half ester. The amount of sodium alkyl sulfosuccinate emulsifier which should be used can vary between about 0.2 to 5% by weight of the polymerization medium.

The ammonium and alkali earth metal borates which are intended to be included within the scope of the term "borate" as used herein are: ammonium borate, $NH_4B_4O_7 \cdot 3H_2O$; anhydrous borax, $Na_2B_4O_7$; borax pentahydrate, $Na_2B_4O_7 \cdot 5H_2O$; sodium borate decahydrate, $Na_2B_4O_7 \cdot 10H_2O$; and potassium tetraborate, $K_2B_4O_7 \cdot H_2O$. The borate itself can be added to the polymerization medium or it can be generated in the medium by the addition of equimolar amounts of boric acid and an ammonium or alkali metal hydroxide or bicarbonate. The preferred borates are the sodium borates listed above. The amount of borate that is used should range between about 0.01% and 3% by weight of the polymerization medium, preferably about 0.01% to 1%.

Conducting the emulsion polymerization of polyvinyl chloride with use of a sodium alkyl sulfosuccinate and an ammonium or alkali earth metal borate gives a reduced amount of polymer plate-out than is encountered using conventional emulsifiers alone or in combination with other additives.

EXAMPLE 1

A control emulsion polymerization was conducted by charging the following reagents into a polymerization reactor:

| REAGENT | AMOUNT(in grams) |
| --- | --- |
| Vinyl chloride monomer | 2512 |
| Ammonium persulfate | 5.0 |
| Sodium lauryl sulfate (Sipex UB, Alcolac Chemical Corp.- 10% solution) | 362.5 |
| Distilled water | 4250 |

The pH of this charge was about 4.5. The temperature was maintained at about 55°C., and agitation was supplied for about 2 hours during which the pH fell to about 2.1. The reaction was terminated, the reactor was allowed to cool, and a gritty buildup of polymer scale was noted on the baffles, impeller, lower sides and bottom of the reactor.

EXAMPLE 2

Another polymerization reactor was charged with the following reagents;

| REAGENT | AMOUNT(in grams) |
| --- | --- |
| Vinyl chloride monomer | 2350 |
| Ammonium persulfate | 4.5 |
| Sodium sulfosuccinate isodecanol half ester emulsifier (Aerosol 268;5% solution) | 400 |
| Distilled water | 3200 |
| Sodium borate | 5.0 |

The mixture, which had a pH of 8.6, was heated to 55°C. and was agitated for about 4½ hours at which time the pH was 3.5 to 4.0. The reactor showed only a slight polymer plate-out on the lower sides and bottom of the reactor. The upper sides were very clean and very little buildup was noted on the baffles and impeller. The improvement was about 50% over the control run in Example 1.

EXAMPLE 3

The procedure used in Example 2 was duplicated in the unwashed reactor from that Example and after reacting for about 6½ hours the same general low level of polymer plate-out was noted.

EXAMPLE 4

The unwashed reactor from Example 3 was charged with the following reagents:

| REAGENT | AMOUNT(in grams) |
| --- | --- |
| Vinyl chloride monomer | 2530 |
| Ammonium persulfate | 5.85 |
| Aerosol 268 (5% solution) | 400 |
| Distilled water | 3200 |
| Sodium borate | 5 |

The pH was about 8.5, and the reaction mixture was heated at about 55°C. for about 6 hours. The pH of the mixture at this point was 4.0 and the interior of the reactor was cleaner than the condition after the run described in Example 1.

What is claimed:

1. In an emulsion polymerization of vinyl chloride monomer in the presence of an emulsifier wherein the improvement comprises conducting said polymerization in a polymerization medium comprising a sodium alkyl sulfosuccinate emulsifier and in ammonium or alkali metal borate.

2. A process as claimed in claim 1 wherein the amount of sodium alkyl sulfosuccinate emulsifier ranges from about 0.5% by weight to 3% by weight of the polymerization medium.

3. A process as claimed in claim 1 wherein the amount of borate ranges between about 0.01% by weight and about 3% by weight of the polymerization medium.

4. A process as claimed in claim 1 wherein the amount of borate ranges between about 0.01% by weight and about 1% weight of the polymerization medium.

5. A process as claimed in claim 1 wherein the borate is selected from the group consisting of the borates of ammonium, sodium and potassium.

6. A process as claimed in claim 5 wherein the borate is a borate of sodium.

7. A process as claimed in claim 1 wherein the borate is added to the polymerization medium.

8. A process as claimed in claim 1 wherein the borate is generated in the polymerization medium by the addition to said medium of boric acid and a compound selected from the group consisting of the hydroxides and bicarbonates of ammonium or the alkali metals.

9. A process as claimed in claim 8 wherein the compound is a hydroxide or bicarbonate of sodium.

10. A process as claimed in claim 1 wherein the sulfosuccinate emulsifier is a sodium sulfosuccinate isodecanol half ester.

* * * * *